Sept. 17, 1968  C. C. FRASER  3,401,545
THEFT PROTECTION FOR VEHICLES IN PARKING LOTS
Filed April 13, 1967
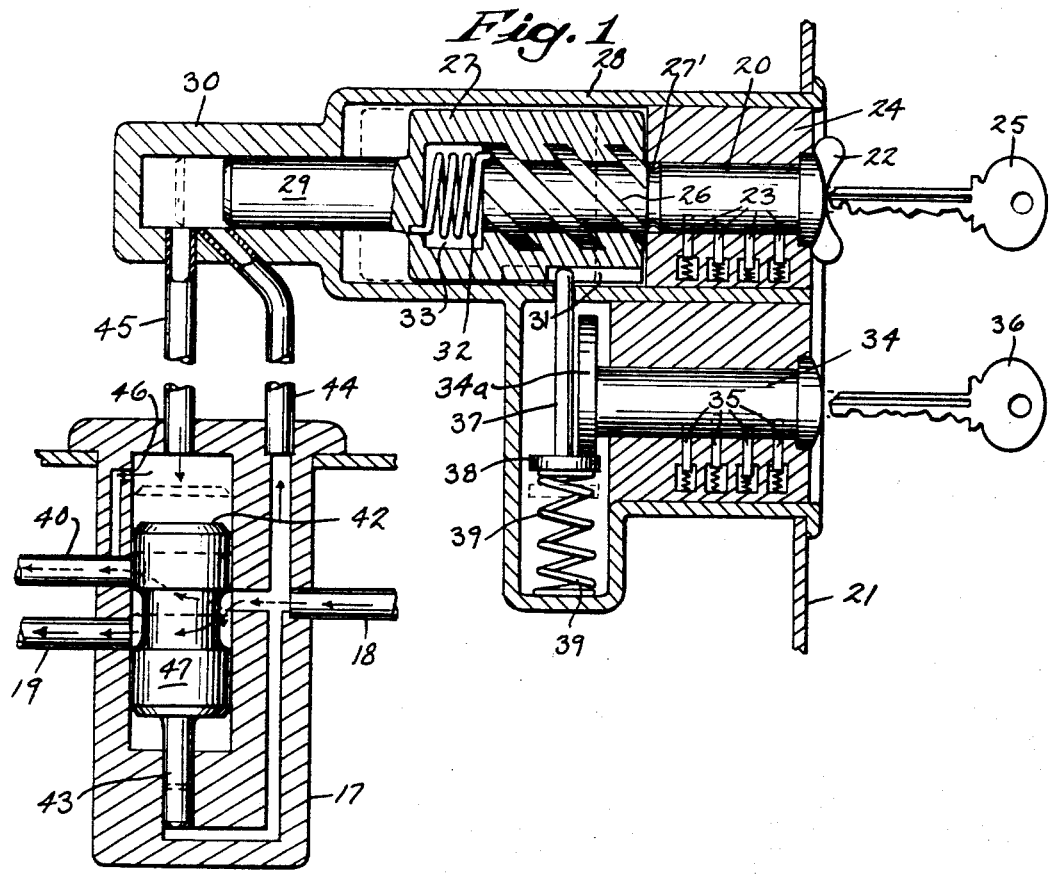
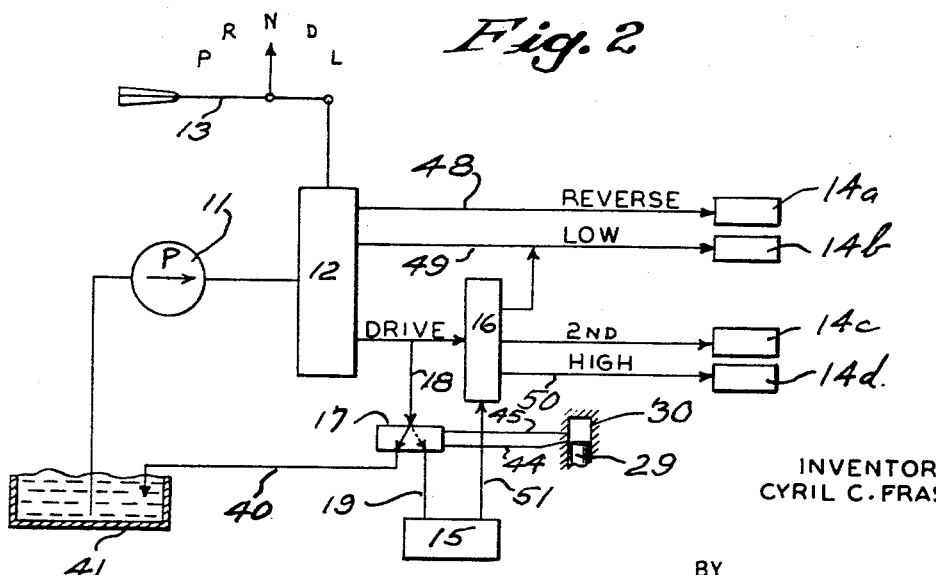
INVENTOR
CYRIL C. FRASER
BY
Morsell & Morsell
ATTORNEYS United States Patent Office 3,401,545
Patented Sept. 17, 1968

3,401,545
THEFT PROTECTION FOR VEHICLES
IN PARKING LOTS
Cyril C. Fraser, 12337 NE. Shoreland Drive,
Mequon, Wis. 53092
Filed Apr. 13, 1967, Ser. No. 630,702
10 Claims. (Cl. 70—255)

ABSTRACT OF THE DISCLOSURE

To protect parked cars against theft while allowing parking lot attendants to move the vehicle, a separate lock is provided under control of a key that may be kept by the owner while he leaves the regular ignition key in place. This separate lock allows operation of the automatic hydraulic transmission through a range so worked out that shifting into "low," "neutral," and "reverse" is permitted, but shifting into "high" or "drive" gear is prevented.

BACKGROUND OF THE INVENTION

Field of the invention

The present invention pertains to theft protection for automobiles in parking lots, and is of a type which allows those movements of the car which the parking lot attendant requires, but which prevents movement in "high" gear.

Description of the prior art

In many parking stations, particularly in large, busy metropolitan areas with limited parking space, drivers are required to leave the keys in the ignition switches of their cars so that the station attendants can move the cars about, to allow other cars to enter and leave the lot. This practice makes it relatively easy for an outsider to steal a car from a parking lot, and the increasing incidence of such thefts is a serious problem in our cities.

The present invention is an improvement upon the disclosure of my co-pending application Ser. No. 612,615, filed Jan. 30, 1967, in which a locking plunger is engageable with a slot in a sector which is mounted on the gear shift shaft to mechanically lock the manual control out of "drive" position. In the present invention the locking plunger serves as a valve member to control the flow of hydraulic fluid in an hydraulic transmission.

SUMMARY OF THE INVENTION

The present invention provides an automatic transmission locking device for cars wherein the hydraulic system can be locked out of the "high" or so-called "drive" position when the car is left in a parking station with the ignition key therein, but wherein said transmission can be shifted into "low," "neutral," "park," or "revesre" to enable the station attendant to move the car when necessary, the locking of said transmission hydraulic system out of "drive" preventing the car from being operated at normal driving speeds and reducing the likelihood of theft.

The present invention also includes the "fail safe" feature of my prior application wherein the lock mechanism is automatically actuated when the ignition is turned "off," without requiring any further action by the driver and eliminating the possibility of the driver forgetting or failing to utilize said lock device, and it also includes the feature whereby the safety device is automatically applied if the lock is forced, drilled or otherwise made inoperable by a thief.

Still further features of the present invention are that the novel lock device is relatively simple in design and construction, is reliable in operation, and is otherwise particularly well adapted for its intended purposes.

BRIEF DESCRIPTION OF THE DRAWING

In the drawing, wherein the same reference numerals designate the same or similar parts in all views:

FIG. 1 is a view principally in vertical section showing the locking device mounted on the instrument panel of a car and showing the hydraulic connections with a control valve mounted on the transmission case, the dotted lines showing another position of the valve; and FIG. 2 is a simplified schematic hydraulic flow diagram showing the invention as applied to an automatic hydraulic transmission of a well known type.

DESCRIPTION OF THE PREFERRED EMBODIMENT

Referring to FIG. 2, this illustrates the invention as applied to a typical automatic transmission of the hydraulic type. The latter consists basically of one or more oil pressure pumps 11 and a speed selector valve 12 operated by the shift lever 13. The selector valve 12 directs oil under pressure to the various servo-mechanisms 14a, 14b, and through shift valve 16 to 14c and 14d of the transmission gear train according to the position of the shift lever 13.

The essential component of all automobile automatic transmissions is a sensing device which is responsive to the forward speed of the car, usually referred to as the governor 15. When the shift lever 13 is set to "high" position, oil under pressure is directed to the governor 15, which actuates one or more shift valves 16 to transmit oil under pressure to the necessary servo-mechanisms so as to accelerate the car through progressive gear ratios into "high" gear, as is well known in the art. If the shift lever is set to "low" or "reverse" however, the governor does not function and no automatic progressive shifting will occur. The maximum car speed under these conditions might be in the order of 20 to 30 m.p.h. at full throttle. With the present invention a by-pass valve 17 is incorporated in the oil supply line to the transmission governing mechanism 15. This functions to prevent the car from operating at high speeds when the supply line 18 is open through the valve 17 and to permit normal operation when the valve 17 is closed. Furthermore, with the present invention the position of by-pass valve 17 is controlled by a locking mechanism which will provide a means to permit slow speed operation as is necessary for parking lot maneuvering, but will function to prevent anyone driving the car away at high speed, as in the case of theft.

Referring now to FIG. 1 of the drawing, illustrated therein is the improved arrangement which is designed to automatically lock the transmission out of "drive" or "high" when the ignition key is turned to the "off" position, without requiring any further action on the part of the operator, said device being unlocked by means of another key removably insertable in an adjacent, coacting lock. By this means an owner cannot fail to lock his car out of "drive" when he turns the ignition off. The device illustrated in FIG. 1 is "fail safe" in this respect. Said improved locking unit is mounted in the instrument panel 21 of an automobile and includes a rotatable core 20 preferably having external grip means 22 thereon, the function of which will be hereinafter seen. Conventional spring-loaded lock tumbler elements 23 are provided in the surrounding housing 24 to prevent undesired rotation of said core 20, and a key 25 is adapted to engage and depress said tumbler elements when it is intended to rotate said lock, as is well known in the art.

Formed on and extending coaxially inwardly from said rotatable lock core 20 is a coarse screw or helix extension 26 which engages within a matching threaded cylinder 27 rotatably and axially movably carried in the lock housing 28. A coaxial pilot valve plunger 29 is formed on and projects inwardly from said cylinder 27 to control the pilot valve 30. Formed in the surface of said cylinder 27 is a longitudinal cutout or groove 31 opening in the forward end thereof.

A coil spring 32 is mounted within an internal cavity 33 in said movable cylinder 27. One end of the spring is anchored in the end of the cylinder 27 and the other end is anchored in the end of the helix extension 26 to prevent rotational movement of the spring with respect to the anchor points. Said spring is thus under axial compression and rotational torsion.

The cam extension 26 is non-movable axially, being designed merely to rotate with the lock core 20. The spring being firmly affixed to the lock core at one end and to the cylinder at the other end exerts both torsional and axial force against the cylinder 27, thus tending to "unwind" said cylinder 27 in the same direction as the pitch of helix 26. In the preferred embodiment illustrated there is a shear connection 27' between the helix extension 26 and the rotatable core 20. This may be of any form, but a weakening groove is illustrated which, if lock cylinder 20 is forced, will break away leaving pilot valve 30 intact. As hereinabove described, said cylinder 27 is both rotatably- and axially-movably carried within the housing, and when it is not locked against rotation the action of the spring 32 causes said cylinder to simultaneously turn and move axially inwardly on said screw member 26 to the broken line position of FIG. 1. This closes pilot valve 30 as illustrated by dotted lines. The resultant action of the main valve will be discussed later.

The spring 32 tends to force the cylinder 27 and the screw 26 apart but, due to the very flat helix or cam faces of the screw threading, preferably at least 45°, a rotational motion is also produced.

Mounted immediately below the transmission control lock 20, as illustrated in FIG. 1, is the ignition lock, including a rotatable core 34, tumbler elements 35, and key 36, said lock being suitably connected to the car's electrical system as is well known in the art. Formed on and projecting inwardly from said rotatable lock core 34 is an eccentric cam element 34a. An upright pin 37 is vertically movably mounted adjacent said cam element, said cam being designed to bear against an enlarged head 38 on said pin, and mounted below the pin and yieldably urging the same upwardly is a coil spring 39.

When the car is in its normal operating condition the locking mechanism is in the full line position illustrated in FIG. 1. In this condition it will be noted that the upper end of the vertically-movable, spring-loaded pin 37 projects upwardly into the groove 31 formed in the cylinder 27, thus locking said cylinder against rotation, the plunger 29 of pilot valve 30 being in open position.

Referring now to the action of the main control valve 17 in the transmission case (see FIG. 1), oil from the speed selector valve 12 enters through inlet pipe 18 and, depending on the postion of the valve 17, discharges to the transmission governor 15 through line 19, or by-passes to the reservoir 41 through line 40.

The positon of valve 17 is determined by the pressure of oil directed against the upper (large) piston 42 and lower (small) piston 43. With pilot valve 30 unlocked oil flows from inlet pipe 18 through the open pilot valve and also flows through lines 44 and 45 and acts against piston 42 of valve 17. A small quantity of oil is allowed to escape through orifice 46 into the tank line 40, but not sufficiently to cause any great pressure loss against piston 42 as long as pilot valve 30 is open.

At the same time oil pressure is applied against piston 43 but this piston being the smaller of the two cannot counteract the force against the larger piston 42. The valve 47 therefore is driven downward to the full line position of FIG. 1. With the locking mechanism in this position the transmission can be operated throughout the complete shift range, including "drive."

When the ignition key 36 is turned to the "off" position the cam 34a turns therewith and depresses the pin 37 against the pressure of the spring 39, as shown in broken lines. As said pin 37 moves downwardly, the upper end thereof is retracted from the groove 31 in the cylinder 27, and said cylinder is free to rotate. As hereinabove mentioned, when said cylinder is not locked against rotation the action of the spring 32 causes said cylinder to turn and move axially inwardly on the helix extension 26 to the broken line position illustrated. In the latter position the control valve 29 closes into "locked" position shown by broken lines. This shuts off oil pressure against piston 42 of valve 17, but as oil continues to escape from orifice 46, piston 43 is driven upwardly to the broken line position by pressure of oil. Oil from supply line 18 is now returned to the reservoir through line 40 and the hydraulic system is locked out of "drive." When locked out of "drive" oil from the selector valve 12 may flow through the conduit 48 to the servo-mechanism which controls "reverse," or through the conduit 49 to the servo-mechanism which controls "low" speed, depending upon the position of the shift lever 13. Because the by-pass valve 17 is in a position providing for by-pass of oil from the line 18 back to the tank, the governor 15 is out of operation and no oil can flow into the "high" speed conduit 50 to act on the servo-mechanisms 14c and 14d which control "high" speed operation.

When it is desired to unlock the transmission of the automobile for normal driving, the ignition key 36 is turned to rotate the cam 36 to a position permitting upward movement of the spring-loaded pin 37. However, when the cylinder 27 was previously rotated during the control-locking operation the groove 31 in said cylinder was also rotated away from its downwardly-facing position and is not in registration with said pin. At the same time, spring 32, being released from tension, has expanded both longitudinally and diametrically to rest against the internal cylindrical surface of cavity 33.

In order to complete the unlocking operation the separate key 25 must be inserted into the upper lock core 20 and said core and screw extension 26 turned counterclockwise by means of said key. Since spring 32 is anchored into screw extension 26 and is not free to further expand within cavity 33, it forces cylinder 27 to rotate counter-clockwise with lock core 20 and screw extension 26 until cylinder groove 31 is again in downward-facing position. At this point spring-loaded pin 37 automatically moves upward to project into said groove 31 to lock said cylinder against further rotation.

Now by turning the core 20 and screw extension 26 clockwise by means of key 25, said axially movable cylinder 27 is drawn forward on said screw member, the pin 37 riding in the longitudinal cylinder slot 31 during said axial travel, until the cylinder reaches the full line position of FIG. 1. In this position the plunger 29 is fully retracted and pilot valve 30 is opened.

The operator may then grasp the lock elements 22 to prevent the core 20 and screw member 26 from turning the opposite way under the action of the spring 32 as he withdraws the key 25, and when said key is removed the tumbler elements 23 function to retain said core and screw extension against rotation. The pilot valve 30 is thus locked in its open position, and the car can be operated in its normal manner, including the use of the "drive" gear. The reason that the car can now be operated in "drive" is that, with the by-pass valve 17 in the full line position of FIG. 1, oil can now flow through the conduit 19 to the governor and from the governor through the conduit 51 leading to the shift valves 16 which control the necessary servo-mechanisms to accelerate the car through progressive gear ratios culminating in the flow of oil through the "high" speed conduit 50 leading to the servo-mechanism 14d which controls "high" gear.

As will be appreciated, one of the unique features of said "fail safe" locking mechanism is that the key 25 must be removed from the lock 20 in order to prevent the lock from automatically again assuming its locking condition. Furthermore, if lock 20 is forced by breaking pins 23 or if it is drilled out or otherwise made inoperative, then cylinder 20 becomes free to rotate as urged by the spring 32, thereby driving valve 29 into the closed position.

Also if the hydraulic lines 44 and 45 between pilot valve 30 and valve 17 are cut off, the entire transmission becomes inoperable from loss of oil. The locking unit illustrated in FIG. 1 is operatively connected in the automobile ignition circuit as shown in FIG. 2 of co-pending application, Ser. No. 612,615, and can also be readily operatively associated with a vehicle's driving lights and directional signals to further deter theft, in the manner fully shown and set forth in co-pending application Ser. No. 612,615.

From the foregoing detailed description it will be seen that the present invention provides a novel locking means for cars having an automatic hydraulic transmission whereby the transmission can be locked out of the "high" or "drive" position when the car is left in a parking station with the ignition key therein, thereby minimizing the possibility of theft.

It is to be understood that while one embodiment of the present invention has been illustrated and hereinabove described, additional modifications thereof will undoubtedly occur to those skilled in the art, and it is intended to include herein not only the illustrated form of said invention but also any and all variations or modifications thereof as may come within the spirit of said invention, and within the scope of the following claims. It is also to be understood that while only one form of known hydraulic transmission has been selected as illustrative, the invention is adapted for use with other known styles.

What I claim is:

1. Theft protection mechanism for use in an automobile having an ignition lock, having an automatic transmission including an hydraulic circuit with a reservoir wherein said circuit has "reverse," "low" and "high" conduits, and having manually operable selector valve means for controlling the flow of hydraulic fluid through said conduits, there being sensing mechanism in said hydraulic circuit responsive to the forward speed of the automobile for controlling the shifting into "high," the improvement comprising means including a pilot valve in said hydraulic circuit for controlling the flow of hydraulic fluid to said "high" conduit while permitting flow to said "reverse" and "low" conduits, and means including a lock in addition to the ignition lock for controlling operation of said pilot valve whereby said hydraulic circuit may be locked out of "high" when said second lock is in a predetermined position.

2. Theft protection mechanism as claimed in claim 1 in which said pilot valve controls the flow of hydraulic fluid to said sensing mechanism.

3. Theft protection mechanism as claimed in claim 1 in which there is a by-pass valve between said selector valve and sensing mechanism, and in which the pilot valve controls the operation of said by-pass valve, there being a by-pass connection leading from said by-pass valve to said reservoir.

4. Theft protection mechanism as claimed in claim 1 in which said pilot valve lock is operatively associated with said ignition lock, and in which there is mechanism whereby the turning of said ignition lock to "off" position releases said pilot valve lock, and wherein the pilot valve has a valve plunger, and in which there is mechanism to thereafter cause movement of said plunger to a position to prevent flow of hydraulic fluid to said "high" conduit while allowing flow to the "reverse" and "low" conduits.

5. Theft protection mechanism as claimed in claim 4 in which the mechanism for thereafter causing movement of the plunger is spring-urged.

6. Theft protection mechanism as claimed in claim 1 in which the pilot valve lock is adapted to be unlocked by means of a separate key removably insertable therein.

7. Theft protection mechanism as claimed in claim 6 in which said separate key must be removed from said valve lock to complete the unlocking thereof.

8. Theft protection mechanism as claimed in claim 7 in which the pilot valve lock has locking tumblers which maintain said lock in transmission unlocking position when the key is withdrawn, and in which there is mechanism responsive to mutilation of the lock for causing transmission locking movement of said pilot valve.

9. Theft protection mechanism as claimed in claim 1 in which the pilot valve includes a movable valve plunger with a connection cylinder, in which there is a helical connection between said cylinder and the core of the lock, in which there is spring means between said connection cylinder and core normally urging the valve plunger to helically extend, and in which there is means between the ignition lock and said valve plunger for preventing rotation of the plunger until the ignition lock is turned to an "off" position.

10. Theft protection mechanism as claimed in claim 9 in which the spring means exerts an axial thrust as well as a torsional effect on the plunger.

References Cited

UNITED STATES PATENTS 2,881,789   4/1959   Finazzo _____ 137—354

FOREIGN PATENTS 520,577   2/1921   France.

RICHARD E. MOORE, *Primary Examiner.*

ROBERT L. WOLFE, *Assistant Examiner.*